United States Patent [19] [11] 4,266,394
VanGinhoven et al. [45] May 12, 1981

[54] GATHERING MEANS MOUNTING ASSEMBLY FOR ROW CROP HARVESTERS

[75] Inventors: Robert M. VanGinhoven, Lancaster; Carl D. Brown, Hershey, both of Pa.

[73] Assignee: Sperry Corporation, New Holland, Pa.

[21] Appl. No.: 172,600

[22] Filed: Jul. 28, 1980

Related U.S. Application Data

[63] Continuation of Ser. No. 943,411, Sep. 18, 1978, abandoned.

[51] Int. Cl.³ .............................................. A01D 45/00
[52] U.S. Cl. ........................................... 56/94; 56/119
[58] Field of Search ...................... 56/119, 94, 98, 104

[56] References Cited

U.S. PATENT DOCUMENTS

| 475,418 | 5/1892 | Robbins | 56/94 |
| 532,646 | 1/1895 | Danner | 56/94 |
| 1,600,836 | 9/1926 | Manson | 56/94 |
| 3,585,790 | 6/1971 | Kalkwarf | 56/119 |
| 3,654,752 | 4/1972 | Segredo | 56/98 |
| 4,083,167 | 4/1978 | Lindblom | 56/98 |

*Primary Examiner*—Robert A. Hafer
*Attorney, Agent, or Firm*—James R. Bell; Frank A. Seemar; Larry W. Miller

[57] ABSTRACT

A mobile harvester unit provided with a row crop attachment having a plurality of laterally spaced generally fore-and-aft dividers defining one or more elongated passageways for accommodating rows of crop material. Crop severing means are disposed along each passageway for cutting crop being guided rearwardly during operation. Feeder assemblies, disposed in longitudinal alignment with the dividers, comprise gathering fingers extending from at least three rigid bars adjacent the passageways. The bars, mounted at equal intervals on rigid rotatable elements, are rotatably driven to impart intermittent rearward motion of the fingers in the passageway to urge crop toward the harvesting unit.

1 Claim, 3 Drawing Figures

GATHERING MEANS MOUNTING ASSEMBLY FOR ROW CROP HARVESTERS

This is a continuation of application Ser. No. 943,411 filed 9-18-78 and now abandoned.

CROSS REFERENCE TO RELATED APPLICATION

Reference is hereby made to the following copending U.S. application dealing with related subject matter, assigned to the assignee of the present invention and filed on or on about the same date as the present application:

Title: Gathering Means for Row Crop Harvesters
Inventor: Robert M. VanGinhoven
Filing Date: 9-18-1978
Ser. No.: 943,412

BACKGROUND OF THE INVENTION

The present invention relates to a row crop attachment for a mobile harvesting unit, and more particularly, an improved drive arrangement for the feeder assembly adapted to feed crop material rearwardly along a passageway defined by side-by-side dividers.

A conventional row crop head for a forage harvester has two or more dividers defining passageways between adjacent fore-and-aft sides. During operation adjacent sides of paired dividers pass on opposite sides of standing stalk type crop material such as corn, maize, sorghum, etc. As the harvester unit travels across the field, gathering means mounted on the dividers engage the crop stalks as they are being guided rearwardly along the passageway. A severing mechanism is provided to sever the stalks a short distance above the ground. After the stalks are severed, the butt ends are gripped for appropriate delivery of the crop material to rearwardly disposed crop handling elements such as a consolidating auger, or infeed rolls at the inlet of a forage harvester base unit.

Various types of gathering means have been employed in the past in row crop heads for guiding and engaging standing crop material, as well as guiding, gripping and feeding severed row crops. For example, it is common to use endless chains trained about paired sprockets. Crop engaging elements such as fingers, lugs, rods, etc., are attached to or are integral with the chains and extend into a passageway defined by dividers. The chain and lug arrangement shown in U.S. Pat. No. 4,072,002 Feb. 7, 1978, to Larry E. Heller et al. is exemplary of this type of prior art gathering means.

Another common type of gathering means used for conveying stalks in row crop heads utilizes a serpentine array of belts mounted on chains and guided along a path adjacent to the crop passageway. In this arrangement, stalks are urged rearwardly by means of paired belts extending from adjacent dividers. An arrangement of this nature is shown in U.S. Pat. No. 3,961,466 issued June 8, 1976, to Virgil B. Martin et al. Numerous other types of row crop head gathering arrangements are used but in typical present day commercial harvesting machines they generally employ an endless flexible element such as a belt, chain or the like. To this end, there is still another known type flexible element similar to a snowmobile belt with integral lugs for performing the stalk engaging and conveying function. In all known arrangements the flexible element causes a relatively high frequency of failures regardless of durability due to the unavoidable wear characteristics in this area of the header caused by continuous crop contact, as well as dust, mud, abrasiveness of crop material, etc. Thus, due to normal wear, it is not uncommon to replace a gathering belt or chain several times during the lifetime of a row crop attachment.

Further, and of even more concern, when chain breakage occurs there is a likelihood of damage to the cutting mechanism of the forage harvester unit. Hardened steel, lugs, gathering fingers, elements of the broken chain, etc., can easily become intermixed with the crop material when a failure occurs and it is difficult to stop the conveyor before damage occurs to the cutterhead and shear bar. Many times an entire broken gathering chain assembly passes through the cutter mechanism before the chain failure is detected. In all instances, the cost of repair, as well as the amount of downtime to the basic unit is to the detriment of the operator.

In the copending application (noted above) filed in the name of Robert M. VanGinhoven and assigned to a common assignee, the above problems are overcome by providing a row crop head having unique gathering means comprising a feeder assembly having rigid members aligned with a passageway. A plurality of crop engaging elements are affixed to each rigid member and appropriate drive of the feeder assembly permits intermittent motion of the elements to urge crop material rearwardly. Although any convenient number of bars is encompassed by the feeder assembly in question, as a practical matter a low number, such as two, three or four has been the most effective due to cost considerations, weight factors, etc. The drive arrangement shown in the preferred embodiment of the copending application mentioned above comprise the subject matter of this invention. Although other drive arrangements have been contemplated and could be employed they necessitate positive drive coupling to both shafts to assure proper rotational characteristics. For example, if two bars or one bar are used, to avoid counter forces, the opposite ends must be initially and continually rotated in the same direction when the feeder assembly is coupled to the drive means. Thus, to assure proper bar rotation the rotatable members on which the bars are mounted must both be positively coupled to the drive shaft which adds to the cost and weight of the overall assembly. In this arrangement, there are more moving parts such as chains and sprockets, gears and shafts, etc., on the drive assembly which increases the chance of failure and downtime by virtue of the mere increase in the number of elements requiring service due to normal wear of drive mechanisms of this nature.

SUMMARY OF THE INVENTION

In one aspect of the present invention, a row crop attachment for a mobile forage harvester unit adapted to advance over a field of crop planted in rows includes a pair of dividers forming a narrowing crop passageway. Each divider has a first and second rotatable element. The elements of one divider are interconnected by a plurality of linear bars, whereas the elements of the other divider are interconnected by a plurality of curvilinear bars. The bars rotate with the rotating elements. A plurality of crop engaging elements are connected to each bar and extend into the passageway for intermeshing in timed relationship to move crop material through the passageway.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DETAILED DESCRIPTION OF THE PREFERRED EMBODIMENT

In the following description, right and left hand references are determined by viewing the attachment from the rear and facing in the direction the head travels during normal operation of the forage harvester on which it is mounted. Also, in the description that follows, it is to be understood that such relative terms as "forward", "rearward", "left", "right", "upwardly", "downwardly", etc., are words of convenience for the purpose of clearly describing the preferred embodiment and are not intended as limitations.

Figure 1:
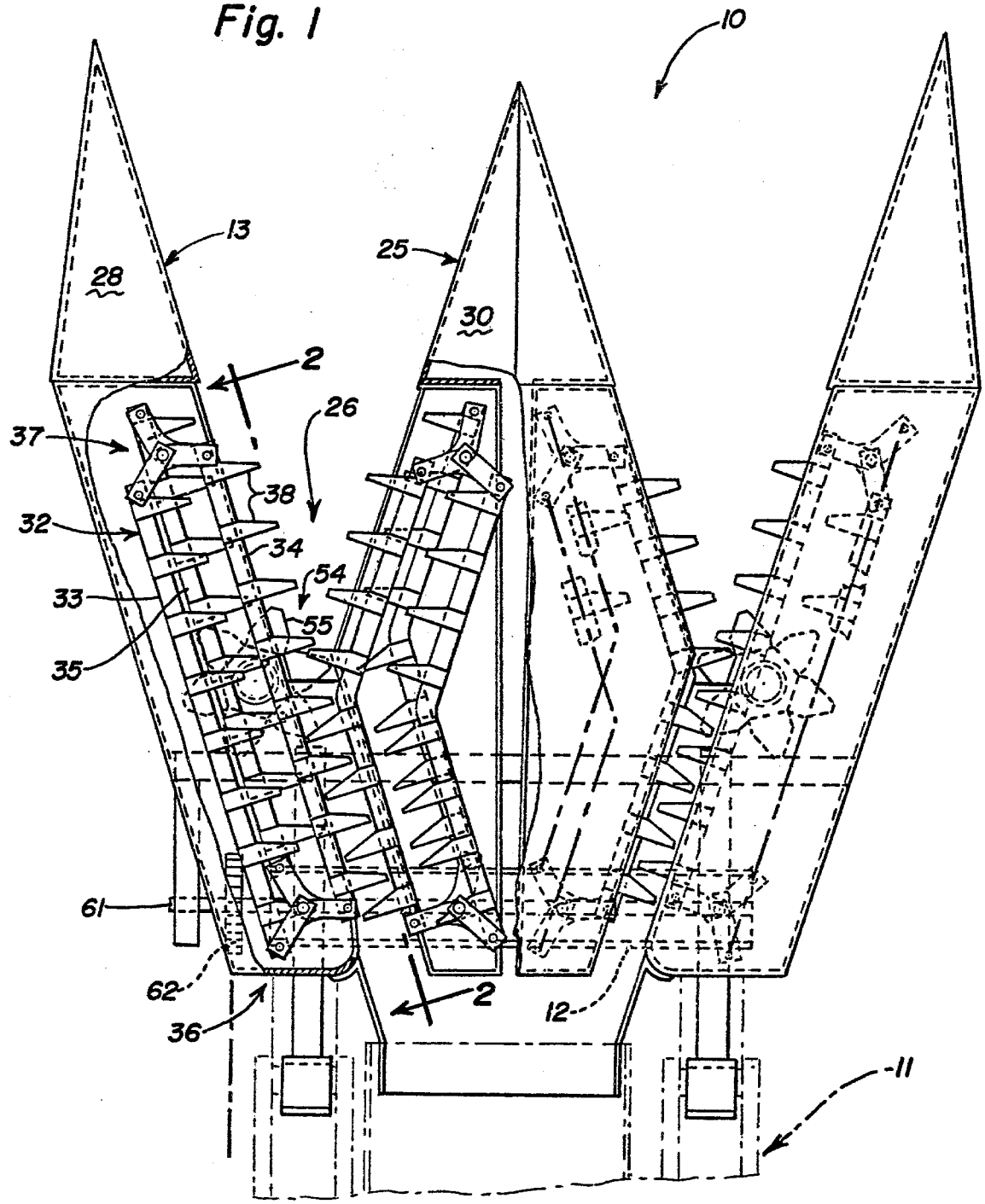
FIG. 1 is a plan view of a two-row row crop header for a mobile harvester unit with portions cut away to more clearly illustrate the area in which the present invention is embodied.

Referring now to the drawings, and particularly to FIG. 1, there is shown a row crop attachment, generally designated by reference numeral 10, mounted on the forward portion of a forage harvester 11 which is only represented schematically in phantom form since it is of a conventional nature and comprises no part of the present invention. The row crop attachment consists generally of one or more row units each having opposing dividers, crop severing means, unique gathering means having a feeder assembly mounted within the divider and drive means to drive the gathering means and severing means. One row unit will be described in detail hereinbelow in operative relationship to a forage harvester.

As is well known, the forward portion of a harvester unit has an inlet opening, generally spanning a substantial portion of its width. A feed roll assembly is commonly mounted rearwardly of the inlet to receive and convey crop material entering via the inlet opening. A front set of feed rolls passes material rearwardly to a rear set of feed rolls that deliver the material to a generally cylindrical cutterhead comprising in most instances a stationary shear bar in operative relationship with a plurality of movable knives for reducing the crop material. Thus, for the purpose of the present invention, it will suffice to say that the attachment, commonly referred to as a head, has a rear discharge opening and is adapted to be mounted on the forward portion of a forage harvester unit such that the discharge opening is in operative communication with the inlet opening of the harvester.

While a two-row head 10 is shown in the drawings for the purpose of illustrating the preferred embodiment of the present invention, the structure of the invention is equally applicable to a single row head or a multi-row head having three or more crop receiving passageways. Likewise, other types of row units having similar overall configuration of side-by-side dividers are also adapted to accommodate the present invention. In the following description, emphasis will be directed to the left row unit of the two-row head shown in FIG. 1 but comments are intended to encompass the mirror image right row unit shown, as well as all other similar row units.

Figure 2:
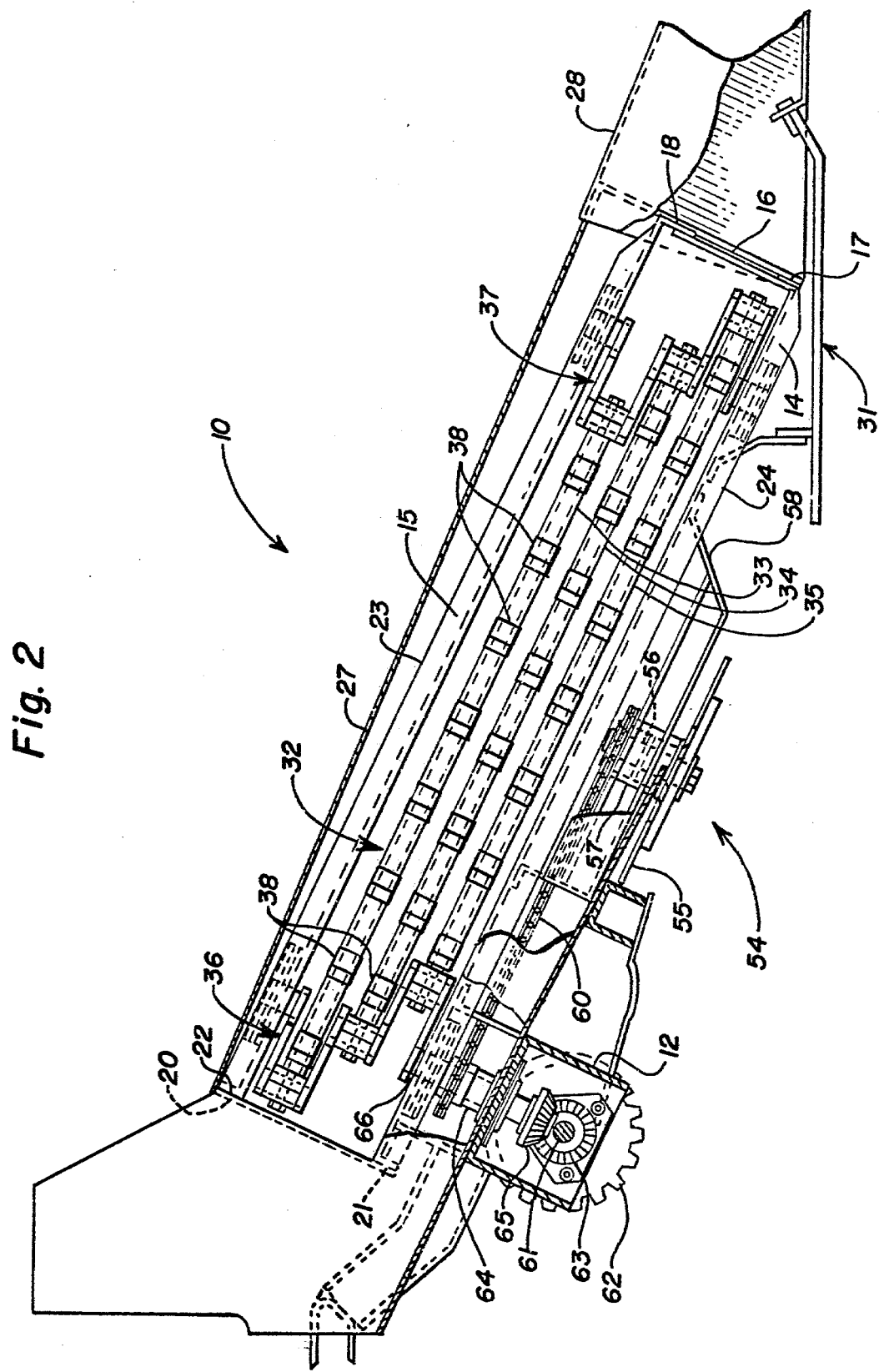
FIG. 2 is a side elevational view taken along line 2—2 of FIG. 1.

Now turning to FIG. 2, row crop head 10 includes a main transverse support assembly 12 on which frames for the individual row units are mounted. The frame for the left divider 13 comprises bottom member 14 and top member 15, both of which extend in a generally fore-and-aft direction. A front frame member 16 is attached to a suitable flange 17 extending upwardly from the front of the bottom frame member 16, and flange 18 extending downwardly from the top frame member 15. A rear frame member 20 is affixed to similar integral flanged portions 21 and 22 extending outwardly from the rear of the top and bottom frame members, respectively. An upwardly turned strengthening flange 23 on top frame member 15 and a downwardly turned strengthening flange 24 on bottom frame member pro- vide rigidity to the overall frame structure. A similar frame is provided for right divider 25 (FIG. 1) but is not described in light of its similarity to the frame for the left divider.

Right and left dividers 25 and 13 which comprise a row unit, are spaced laterally along main support assembly 12 to define an elongated fore-and-aft crop passageway, generally designated by reference numeral 26.

More specifically, the dividers further include sheet metal skins to present smooth surfaces for guiding crops. For example, top surface 27 gradually slopes upwardly and rearwardly from a left snout 28, having a similar slope. Likewise, a similar sloping top surface is provided on the juxtaposed right frame in cooperative relationship to a right snout 30 (FIG. 1) disposed opposite left snout 28 to complete the general configuration of the left row unit. Skid members 31 (FIG. 2, only one shown) extend downwardly and rearwardly from the snout portion of each divider to prevent the pointed front ends from digging into uneven terrain.

The dividers, 13 and 25, are assisted in the gathering function by a feeder assembly, generally designated by reference numeral 32, (FIGS. 1 and 2) mounted below top surface 27 and rearward of snout 28 and 30, respectively. Feeder assembly 32 (FIG. 2) comprises three bars 33,34,35 extending between and rotatably mounted to rearward rotatable element 36 and forward rotatable element 37. A like plurality of crop engaging element 38 extend laterally from equi-spaced mounting points of bars 33,34,35.

Figure 3:
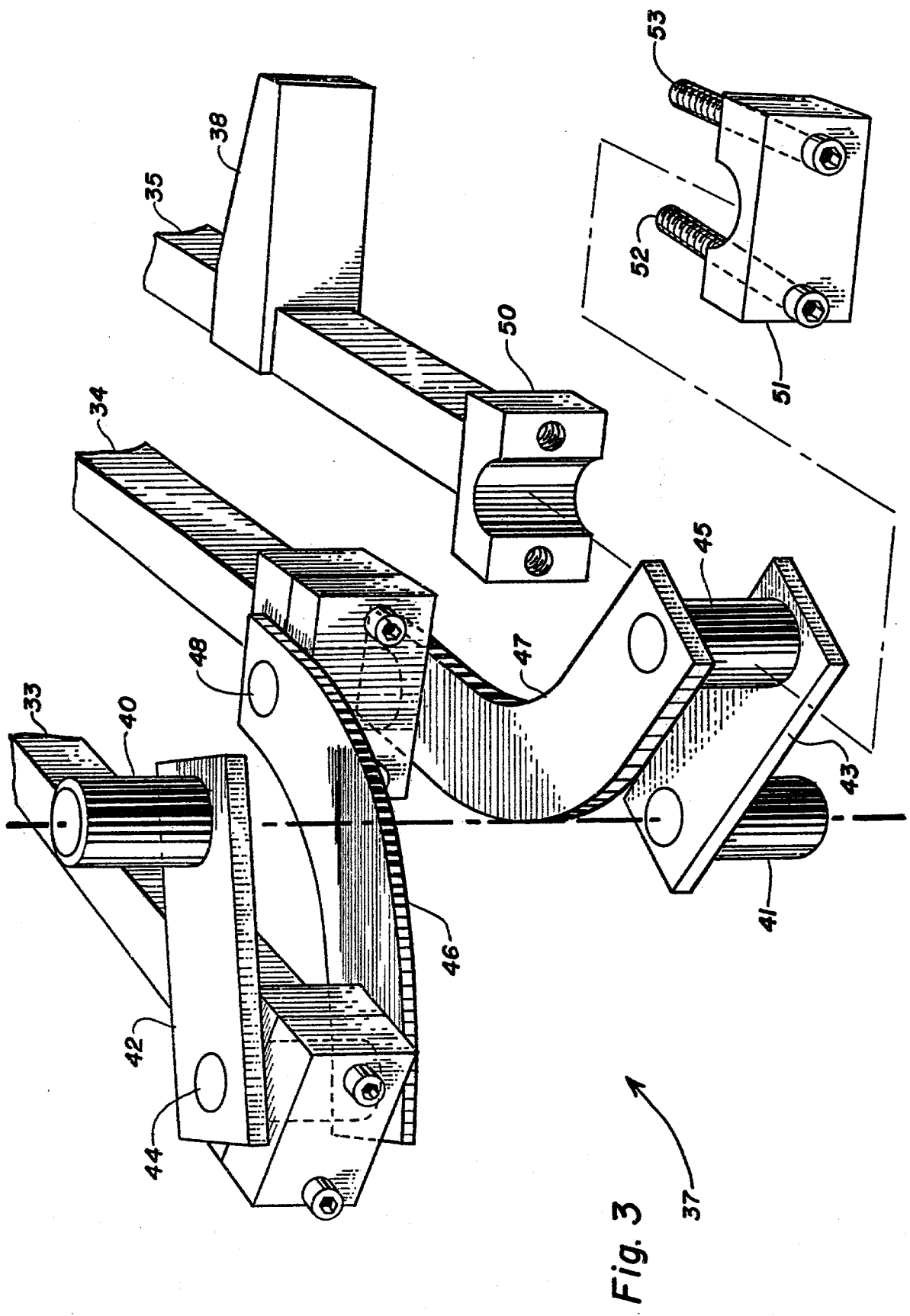
FIG. 3 is a perspective view of a rigid rotatable element on which one end of the rigid members of the feeder assembly of the present invention is mounted.

FIG. 3 is a perspective view showing the configuration of forward rotatable element 37. Also shown in FIG. 3 are the forwardmost ends of bars 33,34,35 and the securement therefor. Element 37 comprises stub shafts 40 and 41 axially aligned and affixed to arms 42 and 43, respectively, which are in turn secured at their opposite ends to interconnecting rods 44 and 45. Arcuate arms 46 and 47 extend to a third interconnecting rod 48 which completes the overall configuration of rigid element 37. Rods 44, 45 and 48 form bearing surfaces about which mating blocks 50 and 51 are secured for rotation by screws 52 and 53, or other suitable means. Stub shafts 40 and 41 are journalled for rotation in top frame member 15 and bottom frame member 14 (see FIG. 2). Rear rotatable element 36 is likewise journalled with frame members 14 and 15 for rotation within the divider.

For severing crops, the head is provided with a rotary cutting mechanism 54 disposed in each passageway. The mechanism for the left passageway (the unit shown in FIG. 1) is shown in elevation in FIG. 2. A rotary element 55 is mounted on the lower end of shaft 56 journalled in support 57 affixed to housing 58 which in turn is affixed to bottom frame member 14. The cutting function is performed in a conventional manner as stalks enter the area of cutting mechanism 54 by virtue of shaft rotation provided by means of sprocket chain 60.

The drive for the row unit includes a transverse input shaft 61 housed in main transverse support assembly 12. Mounted on the left end of shaft 61 is a sprocket 62 which is connected by a chain (phantom outline FIG. 1) to a drive sprocket (not shown) of the harvester. Spaced along shaft 61 is an array of bevel gears 63, one each of which is associated with a particular rear rotatable element by means of a coupling assembly 64. Gear 63 mates with a corresponding bevel gear 65 mounted for rotation with stub shaft 66. Sprocket 60 is also driven by means of the same mating bevel gear arrangement. Thus, power from the harvester unit 11 is transmitted through input shaft 61 to drive the feeder assemblies and severing mechanism associated with each row unit.

In operation, the row crop attachment 10 shown in FIG. 1 is attached to the forward portion of a forage harvesting unit and guided across the field along rows of crop material. As the row crop material is approached the side-by-side dividers 13 and 25, crop engaging elements 38 assist the dividers in guiding the material in the direction of severing means 54. Upon severance, the crop material is more securely engaged by elements 38 and fed along the rearward portion of the passageway between left divider 13 and right divider 25 to a discharge opening in communication with an inlet to the forage harvester. Other means, not forming a part of this invention, assist in guiding the standing crop such that the butt ends of the severed crop are fed rearwardly to the inlet of the forage harvester unit.

The gathering assembly comprises a feeder assembly consisting of bars 33,34,35 having crop engaging elements extending inwardly toward the passageway between the left and right dividers. These bars are mounted on rotatable elements 36 and 37 such that the crop engaging elements of bar 34 extend from the left divider 13. In sequence, the crop engaging members of bar 35 then bar 33 and finally bar 34 return to the position shown to extend into the passageway and move rearwardly during operation to engage the crop material and urge it rearwardly during the path of travel of the elements in the passageway. Thus, the feeder assembly serves to engage material in its standing condition and guide it toward the severing means in cooperation with the left and right dividers which travel on opposite sides of a standing row of crop. The feeder assembly also grips and feeds severed crop rearwardly through the rearward portion of the passageway defined by the rearmost portions of left and right dividers 13 and 25.

It thus can be appreciated that the unique design of the drive means for the feeder assembly provides for a continuous, uninterrupted and unhesitating flow of stalks rearwardly from the front to the rear portions of the passageway between the dividers. Although the actual engagement by crop engaging elements on ecah bar is intermittent the rotation of three bars mounted on the rotatable elements provides for a continuous uninterrupted engagement of crop material by the crop engaging elements of the feeder assembly. Further, the drive arrangement for the rigid feeder bar structure enhances the unique design feature of the copending application mentioned above in which the structure of the bars may take varying shape corresponding to the side of the passageway defined by the divider from which they extend. For example, as shown in FIG. 1, the right divider is angularly disposed with respect to the left divider and the feeder assembly bar members have corresponding shapes to permit the crop engaging elements to extend outwardly along the entire passageway. Any configuration of this nature in which three or more bars are utilized is significantly affected by the unique drive arrangement of the present invention.

While the preferred structure in which the principles of the present invention have been incorporated is shown and described above, it is to be understood that the invention is not to be limited to the particular details, as shown and described above, but that, in fact, widely different means, such as four or more rigid members in the feeder assembly, may be employed in the practice of the broader aspects of the invention.

Having thus described the invention, what is claimed is:

1. A row crop attachment for a mobile forage harvester unit adapted to advance over a field of crop planted in rows, said attachment comprising in combination:
   a pair of dividers being of a construction sufficient for forming a narrowing crop passageway;
   a first and a second rotatable element connected to each divider, the first and second rotatable elements of one divider being interconnected by a plurality of one-piece substantially linear bars in stacked relationship, the first and second rotatable elements of the other of the dividers being interconnected by a plurality of one-piece, substantially curvilinear bars in stacked relationship, said linear and curvilinear bars being of a construction sufficient for movement with said rotating elements adjacent said narrowing crop passageway; and
   means for moving crop material through said narrowing passageway, said means being a plurality of crop engaging elements connected to each of said bars and extending into said narrowing passageway for intermeshing in timed relationship.

* * * * *